Nov. 6, 1962   R. A. SAHA   3,062,075
ROUTER JIGS
Filed Dec. 1, 1960   2 Sheets-Sheet 1
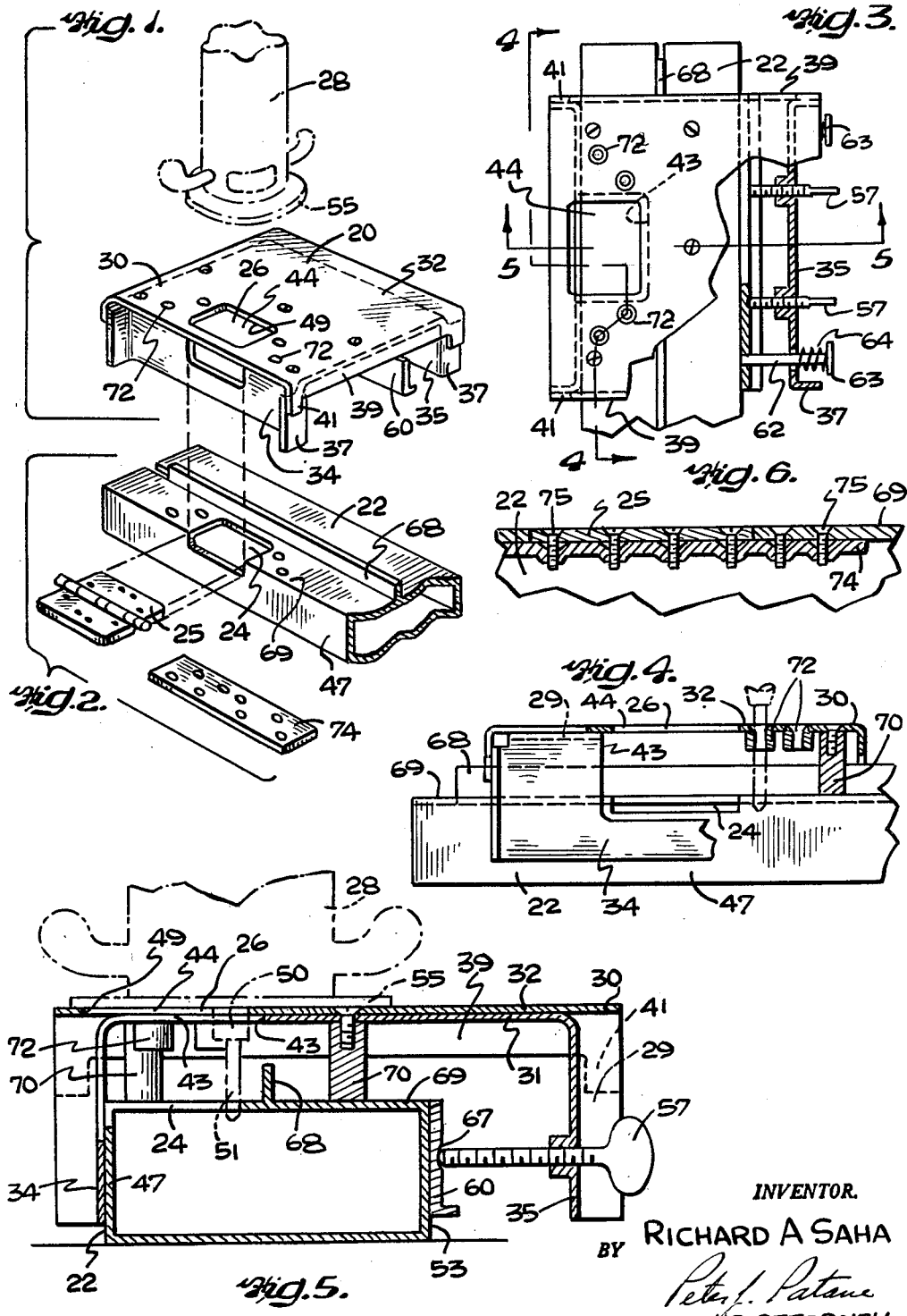
INVENTOR.
RICHARD A SAHA
BY Peter J. Patane
HIS ATTORNEY Nov. 6, 1962  R. A. SAHA  3,062,075
ROUTER JIGS
Filed Dec. 1, 1960  2 Sheets-Sheet 2

INVENTOR.
RICHARD A. SAHA
BY Peter J. Patane
HIS ATTORNEY

United States Patent Office
3,062,075
Patented Nov. 6, 1962

3,062,075
ROUTER JIGS
Richard A. Saha, 443 W. Jefferson St., Media, Pa.
Filed Dec. 1, 1960, Ser. No. 72,897
7 Claims. (Cl. 77—62)

This invention relates to improved jigs utilized in connection with the assembly of hardware items, such as hinges, to tubular structural members, such as extruded aluminum tubes. It is an object of the present invention to facilitate the utilization of such tubular members and to increase the accuracy with which the tubular members may be cut and drilled prior to final assembly of the parts.

As explained in my copending patent applications, Serial Numbers 833,832 and 33,176, many commercial installations are being made utilizing extruded tubular aluminum members for the jambs and frames of doorways and windows, respectively. In many instances, hardware items, such as different types of hinges, are secured to the tubular members during the assembly of the complete unit. The proper assembly of the hardware items usually requires that a part of the tubular member be cut away to receive the hardware item, in addition to drilling the tubular member with suitable holes to receive screws for securing the hardware item to the tubular member. Another object of this invention is to provide improved jigs for simultaneously defining the area of the tubular member to be cut out and the position of the holes to be drilled.

This invention also provides a template or guide base which is spaced from the tubular member to be routed to accommodate any projecting ribs on the tubular surface and to allow a space into which the cuttings may enter. Also, in certain of the jigs embodying the invention, the bushings used to locate the holes to be drilled in the tubular members are shielded by a part of the base upon which the router rests to protect them from being damaged inadvertently.

In one embodiment of this invention, a jig comprises a base plate upon which the router tool rests and a locating depending side bar. A force plate is disposed opposite to and spaced from the side bar and the work to be routed is held between the side bar and the force plate. A support bar is secured to the base plate and is provided with adjustable means for securely biasing the force plate against the work. The base plate is provided with an opening for guiding the router tool. The side bar may or may not have an opening to accommodate the router tool depending on the location of the opening to be routed. The adjustable means includes screws and dowels carried by the force plate, the dowels extending through larger holes in the support bar and being provided with springs to bias the force plate toward the support bar. Also, the dowels have ends which are seated in depressions in the force plate for minimizing movement of the force plate transverse to the screws.

The foregoing and other objects of this invention, the principles of this invention, and the best modes in which I have contemplated applying such principles will more fully appear from the following description and accompanying drawings in illustration thereof.

In the drawings:

FIG. 1 is an exploded perspective view illustrating a router jig for forming an opening in a tube together with a typical router in dot-dash lines, the latter shown spaced from the base of the router jig with which it is associated when cutting the opening in the tube;

FIG. 2 is an exploded perspective view of a tube, a butt hinge and a reinforcing member and wherein an opening has been cut in the tube for receiving one half of the butt hinge illustrated;

FIG. 3 is a top elevation view of the jig illustrated in FIG. 1 showing the jig illustrated in position on the tube preparatory to cutting the hinge opening and a part of the jig illustrated in section;

FIGS. 4 and 5 are sectional views taken along the lines 4—4 and 5—5, respectively, in FIG. 3;

FIG. 6 is a sectional view illustrating the hinge, reinforcing member and a part of the tube illustrated in FIG. 2 in the final assembled position.

Figure 11:
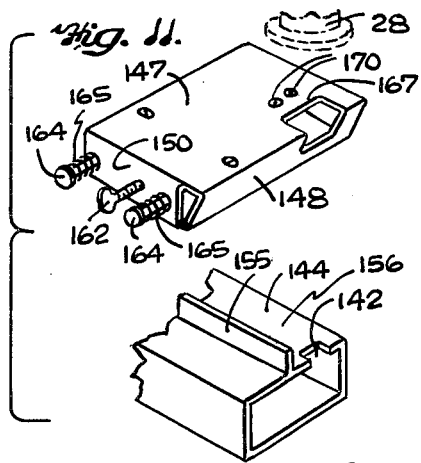
Figure 7:
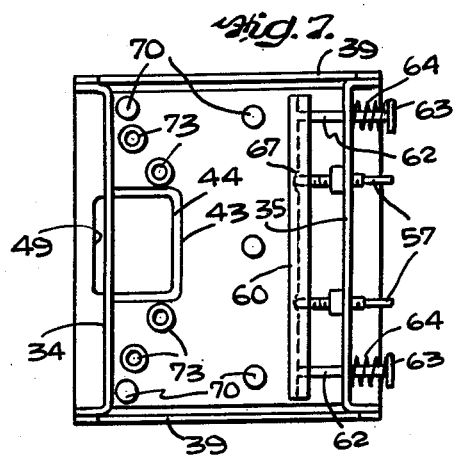
Figure 12:
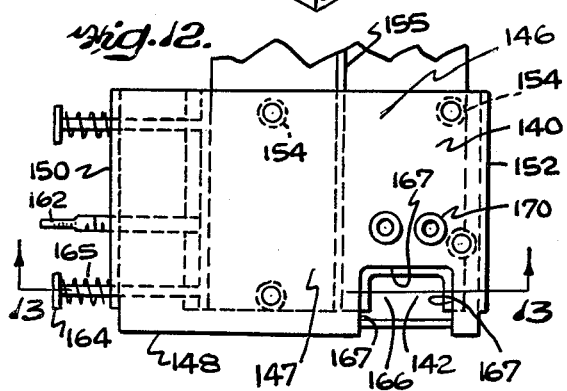
Figure 9:
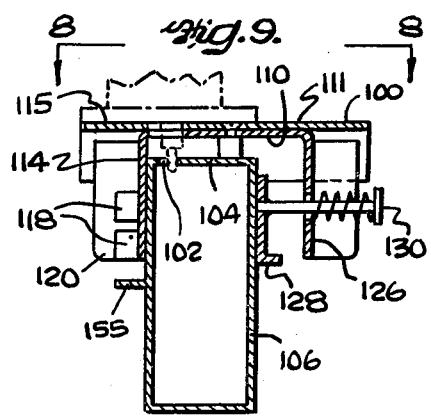
Figure 13:
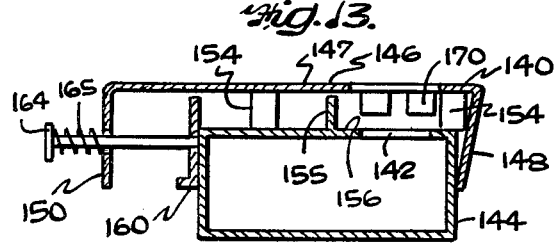
Figure 8:
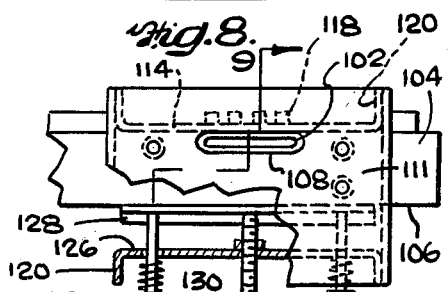
Figure 10:
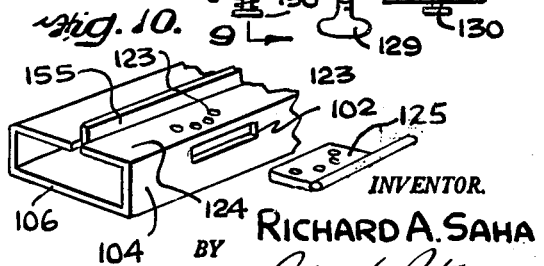

FIG. 7 is a bottom view of the jig illustrated in FIG. 1;

FIG. 8 is a top view of a modified jig and a portion of another tube for forming a slot in the tubular member adapted for a center pivot hinge;

FIG. 9 is a sectional view taken along the line 9—9 in FIG. 9;

FIG. 10 is an exploded perspective view of a portion of the tube and the half of a butt hinge which is to be secured to the tube, after a suitable slot has been formed in the tube;

FIG. 11 is a perspective view of a further modified jig for forming an opening in still another tube adapted for a bottom offset pivot hinge;

FIG. 12 is a top view of the jig illustrated in FIG. 11 associated with an end of another tube;

FIG. 13 is a sectional view taken along the line 13—13 in FIG. 12; and

Figure 14:
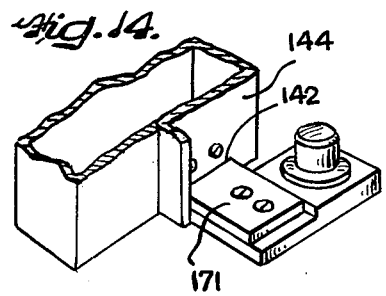

FIG. 14 is an exploded perspective view of a portion of the bottom offset hinge to be secured to the tube, after a suitable opening has been formed therein.

Referring to the drawings in detail, FIG. 1 illustrates a jig 20, utilized with a tubular jamb member or tube 22 of a doorway, for defining an opening 24 in the tube 22 to receive one-half of the butt hinge 25. The opening 24 is cut by a suitable router tool 28 guided by a template opening 26 in the jig 20.

The jig 20 is formed by two inverted, interfitting, abutting generally channel-shaped inner and outer members 29 and 30, respectively, secured to each other so that the flat bases 31 and 32 of the channels are in intimate contact. The template opening 26 is formed in the base 32 of channel 30. The inner or bottom channel 29 also includes a leg or locating side bar 34 and a leg or support bar 35, each being in turn formed with outwardly extending leg portions 37 in abutment with the two opposed legs or flanges 39 depending from the base 32 of the outer or top channel 30. The channels 29 and 30 are placed in interfitting abutment with each other so that the axis of channel 29, which is parallel with the flanges 39, is perpendicular to the axis of the channel 30, which is parallel to the bars 34 and 35. The abutting leg portions 37 and the downwardly elongated ends 41 of the flanges 39 may be permanently secured to each other by welding or removably secured to each other by screws (not illustrated).

The template opening 26 comprises two openings 43 and 44 formed in the bases 31 and 32. The openings 43 and 44 are positioned over and adjacent the side bar 34 to locate the butt hinge 25 in the desired place relative to the wall 47 of the tube 22. The opening 44 is defined by peripheral edges 49 and is large enough so that when the router tool collar 50 of router bit 51 is biased and slidably guided along the edges 49, the opening 24 will be the size required to accommodate one half of the butt hinge 25. As illustrated, the opening 44 overhangs the wall 47. The opening 43 is made larger than the opening 44, as illustrated, and the opening 43 extends into the side bar 34 since the opening 24 extends into the wall 47, as illustrated. The base 32 overhangs the wall 47 and the opposite wall 53 to provide a large bearing surface for the bearing plate 55 of the router tool 28. Thus, if the edges 49 become chipped or otherwise damaged, the channel 30 may be replaced by a new, similarly formed channel and the existing channel 29 used.

Connected to the support bar 35, are two thumb screws 57 having threaded stud portions extending through threaded openings in the bar 35, as illustrated in FIG. 5. The ends of the thumbs 57 bear against a force plate 60, between the bars 34 and 35, and bias the bar 34 and the plate 60 against the wall 47 and 53, respectively, tightly securing the jig 20 to the tube 22 at the proper location along the tube 22. To keep the force plate 60 biased toward the bar 35, for facilitating transfer of the jig from one location to another along the tube 22, two dowels 62 are rigidly connected at their left hand ends, FIG. 3, to the force plate, flush with the surface of plate 60 which bears against the wall 53 and the dowels 62 freely extend through larger holes in the bar 35. The dowels 62 are provided with collars 63 and compression springs 64 between the collars 63 and the bar 35 for keeping the force plate 60 biased against the ends of the thumb screws 57 (toward the bar 35).

To prevent the force plate 60 from sliding along the ends of the thumb screws 57 and moving transverse to the screws to extreme upper or lower positions (FIG. 5) when the jig 20 is removed from the tube 22, the right hand surface of the force plate 60 is formed with concave, spherical-like depressions 67 in which the spherical-like ends of the thumb screws 57 are seated and maintained in this general position by the bias of springs 64.

As illustrated, the tube 22 has an upstanding rib 68 and the bases 31 and 32 overlie and are spaced from the rib 68 and the top wall 69 of the tube 22 by five spacers 70, FIGS. 5 and 7. The spacers 70 are secured to the bases 31 and 32 on opposite sides of the rib 68 by suitable screws. The spacers 70 maintain the upper surface of the flat base 32 co-planar with the horizontal upper surface of the base 31 spaced from the tube wall 69. The space between the wall 69 and the base 31 which is thus formed accommodates the rib 68 and the metal cuttings which are formed during the cutting of the opening 24. Also, any burrs on the edge margins defining the opening 24 are similarly accommodated.

On opposite sides of the template opening 26, FIGS. 3 and 4, are disposed drill bushings 72 for locating holes in the wall 69 of the tube 22 into which screws 72 may be inserted, FIG. 6, for securing a reinforcing plate 74 to the bottom of the wall 69. The plate 74 is predrilled with suitable holes to receive the screws 73 and additional screws 75 for securing one-half of the butt hinge 25 to the wall 69. As illustrated in FIG. 4, the drill bushings 72 need not extend into contact with the wall 69.

The heads of all the screws which secure the spacers to the bases 31 and 32 and the upper portions of the drill bushings 72 are all housed in recessed holes in the base 32 so that no obstruction is presented to the slidable movement (along the flat upper surface of the base 32) of the bearing plate 55.

In using the jig 20, the cooperation of the bar 34 abutting the wall 47, locates the opening 24 relative to the wall 47. The position of the opening 24 along the longitudinal axis of the tube 22 is determined by adding to the distance between one end of the tube 22 and the closest flange 39, the distance between this flange 39 and the template opening 26.

When the jig 20 has been properly located and positioned upon the tube 22 for cutting the opening 24, the thumb screws 57 are tightened a sufficient amount. The tool bit 51 is inserted into the template plate opening 26 adjacent the edge margin 49 defining the opening 26 and the tool bit 51 is manipulated until it drills through the wall 69. Thereafter, the bearing plate 55 of router tool 28 slides manually upon the upper surface of base 32, while the operator biases the collar 50 of the router bit 51 against the peripheral margins 49. When the router tool 28 has been taken once around the periphery of the opening 26, the opening 24 has been formed in the tube 22.

Referring to FIGS. 8, 9 and 10 there is illustrated a modified jig 100, similar to the jig 20, but adapted to form a slot 102 in the side wall 104 of the tube 106 by the use of the template opening 108 in the bases 110 and 111 of the inner and outer channels 114, and 115, respectively. Drill bushings 118 are secured to the inner channel 114 and are shielded from accidental injury by the upwardly extending legs 120 and the overhanging portion of the base 111 which is part of the outer channel 115. The slot 102 is adapted to receive one-half of a butt hinge 125, as illustrated in FIG. 10 and suitable holes 123 are drilled, by the use of drill bushings 118, secured to the side bar, to insert screws in the wall 124 of the tube for securing the hinge to the tube. The support bar 126 and the force plate 128 are similar to those previously described except that only one thumb screw 129 and two dowels 130 are needed.

Referring to FIGS. 11 to 14, a router jig 140 is illustrated for use in cutting an opening 142 in the end portion of a tube 144. The jig 140 comprises a body portion 146 bent upon itself to form a flat base 147, a depending front flange 148 and depending side flanges 150 and 152. Four spacers 154 on opposite sides of rib 155 are used to space the base 147 from the rib 155 and the wall 156 of the tube 144. Two of the spacers 154, as illustrated, are positioned above the right hand side wall of the tube 144 for lending maximum support to the base 147. The two other spacers 154 are positioned inwardly of the left hand side wall of the tube so that the jig 140 may be used with tubes of varying width.

The jig 140 is provided with a movable force plate 160 secured to the flange 150 by thumb screws 162 and two dowels 164 including springs 165, similarly to the previously described embodiments. The base 147 is provided with a template opening 166 defined by three edges 167 for guiding the router tool in cutting the opening 142. The opening 166 continues into the depending front flange 148 so that the router bit does not impinge the flange 148 during the cutting operation. The base 147 is also provided with drill bushings 170 for drilling holes in the tube 144 in which are placed suitable screws to secure one half of an offset pivot hinge 171 to the tube.

In using the jig 140, the location of the opening 142 is determined by the abutment of the lowermost portions of the flanges 148 and 152 with the end of the tube 144, as illustrated. By bending these in or out a varying amount, the location of the template opening 166 can be changed. After the location of the opening 166 is determined, the abutting edges of the flanges 148, 150 and 152 may be welded to each other so that the location of the opening 166 will remain the same thereafter, relative to the end of the tube.

It will be noted that in the embodiment of FIG. 13, the drill bushings 170 which are frictionally secured to the base 147 extend toward the tube 144 and are disposed within the space between the base 147 and the tube wall 156, similarly to the embodiment of FIG. 5. Thus, these base surfaces support the drill bushings while also providing flat surfaces upon which the router tool may be moved. On the other hand, in the embodiment of FIG. 9, the drill bushings extend outwardly, being disposed flush with the surface of side bar which bears against the tube, so as not to interfere with the securing function of the side bar.

Having described this invention, I claim:

1. A jig for use in cutting holes with a routing tool in tubular members comprising two channel members, said channel members being disposed in interfitting abutting relation with their channel axes transverse to each other, the side members of the inner channel shaped member including strengthening leg portions which in turn form additional channel shapes, one of the bases of said interfitting channel members having a guide opening for guiding the routing tool and the other base having an opening sufficiently large to clear the routing tool.

2. A jig for use in cutting holes with a routing tool in tubular members comprising two channel members, said channel members being disposed in interfitting abutting relation with their longitudinal channel axes transverse to each other, the side members of the inner channel shaped member including strengthening leg portions which in turn form additional channel shapes, one of the bases of said interfitting channel members having a guide opening for guiding the routing tool, one of said side members determining the location of said guide opening and having an opening to clear the routing tool, means supported by the other side member for securing said jig to the tubular member.

3. A jig for use in cutting holes with a routing tool in tubular members comprising two channel members each having a base and sides, said channel members being disposed in interfitting relation with their channel axes transverse to each other, the side members of the inner channel shaped member including strengthening leg portions which in turn form additional channel shapes, the outer base of said interfitting channel members having a guide opening for guiding the routing tool, one of said side members determining the location of said guide opening, a force plate biased toward the other side member, a screw for securing said force plate against said tubular member, said force plate having openings for receiving the end of said screw to minimize the tilting of said force plate relative to said side member, and spacers for positioning said interfitting channel members, the outer channel member base forming a flat surface upon which said router is slidably movable.

4. A jig for use in cutting holes with a routing tool in tubular members comprising two channel members, said channel members being disposed in interfitting relation with their channel axes transverse to each other, the side members of the inner channel shaped member including strengthening leg portions which in turn form additional channel shapes, one of the bases of said interfitting channel members having a guide opening for guiding the routing tool, one of said side members including drill bushings for defining the locations of holes in said tubular member, said drill bushings being guarded by said legs of said side member and an overhanging base portion of said outer channel member.

5. A jig for use in routing and drilling openings in a work piece comprising a channel member having a base member and two side members, a locating bar extending between the side members of the channel member, said locating bar having two legs at its extremities extending outwardly with respect to said locating surface and work piece and which are in abutment with terminal portions of the side members, a force plate opposed to said locating bar and spaced therefrom, a support bar extending between the side members of the channel member, said force plate being intermediate said locating bar and said support bar, said base member having a guide opening for guiding a routing tool, said locating bar having a guide bushing for guiding a drilling tool, said base member having a portion overhanging said guide bushing, means for biasing said force plate toward said support bar and other means for overcoming said bias.

6. A jig for use in routing and drilling openings in a work piece comprising a channel member having a base member and two side members, a locating bar defining a locating surface extending between the side members of the channel member, said locating bar having two legs at its extremities extending outwardly with respect to said locating surface and work piece and which are in abutment with terminal portions of the side members, a force plate opposed to said locating bar and spaced therefrom, a support bar extending between the side members of the channel member, said force plate being intermediate said locating bar and said support bar, said base member having a guide opening for guiding a routing tool, said base member having a guide bushing for guiding a drilling tool, means for biasing said force plate toward said support bar and other means for overcoming said bias and securing said jig to the work piece, said other means including a threaded screw supported in threaded holes in said support bar, the end of said screw being positioned in depression in said force plate, said first means including a spring biasing said force plate toward said support bar.

7. A jig for use in cutting holes with a routing tool in a tubular member comprising a flat portion and three depending flanges, two of said flanges locating the jig relative to the tubular member, said flat portion and one end of said flanges having openings therein, the opening in said flat portion guiding a routing tool for cutting an opening in said tubular member, means supported by the third flange for securing the jig to the tubular member, and spacers carried by the flat portion to space the flat portion from the tubular member.

References Cited in the file of this patent

UNITED STATES PATENTS

| | | |
|---|---|---|
| 2,641,147 | Sulc | June 9, 1953 |
| 2,801,655 | Zern | Aug. 6, 1957 |